United States Patent [19]
Landis et al.

[11] Patent Number: 5,428,400
[45] Date of Patent: Jun. 27, 1995

[54] ENABLING A DISPLAY OF CLOSED CAPTIONING STATUS UPON DETECTING A CODE OF A PROPER SUBSET OF CLOSED-CAPTION DATA CODES

[75] Inventors: Michael D. Landis, Fishers; Joseph W. Forler, Indianapolis; Paul D. Henry, Carmel, all of Ind.

[73] Assignee: Thomson Consumer Electronics, Inc., Indianapolis, Ind.

[21] Appl. No.: 10,822

[22] Filed: Jan. 29, 1993

[51] Int. Cl.⁶ .............................................. H04N 7/025
[52] U.S. Cl. .................................... 348/569; 348/461; 348/465
[58] Field of Search ............... 358/147, 142, 146, 188, 358/183, 22; 348/461, 465, 564, 569; H04N 7/08, 7/087, 5/262, 5/265, 5/268, 5/272, 5/278, 5/445, 5/45

[56] References Cited

U.S. PATENT DOCUMENTS

| | | | |
|---|---|---|---|
| 4,520,392 | 5/1985 | Cox et al. | 358/147 |
| 5,315,386 | 5/1994 | Muramoto | 348/569 |

FOREIGN PATENT DOCUMENTS

| | | | |
|---|---|---|---|
| 0041034 | 3/1980 | Japan | 358/142 |
| 0111494 | 7/1983 | Japan | 358/147 |
| 0146585 | 8/1985 | Japan | 358/147 |
| 0296880 | 11/1989 | Japan | H04N 7/080 |
| 0237886 | 10/1991 | Japan | H04N 7/080 |

OTHER PUBLICATIONS

Daniels, J. F. "Wireless World Teletext Decoder; 2-The decoder system" Wireless World Dec. 1976 pp. 563-566.

Primary Examiner—James J. Groody
Assistant Examiner—David E. Harvey
Attorney, Agent, or Firm—Joseph S. Tripoli; Peter M. Emanuel; Thomas F. Lenihan

[57] ABSTRACT

In a television system including closed caption circuitry for receiving and decoding closed caption data, a controller continually monitors the closed caption circuitry for an indication of the presence of any of a plurality of predetermined valid closed caption data codes. Every time any of the predetermined valid closed caption data codes is detected, a timer is reset to begin timing a predetermined time interval, and an on-screen display indicating that closed caption data are available is enabled. If a subsequent one of the predetermined valid closed caption data codes is not detected before the expiration of the time interval, then the on-screen display indicating that closed caption data are available is disabled. In another embodiment of the invention, a lamp is illuminated to indicate the availability of useful closed-caption data.

17 Claims, 10 Drawing Sheets

ENABLING A DISPLAY OF CLOSED CAPTIONING STATUS UPON DETECTING A CODE OF A PROPER SUBSET OF CLOSED-CAPTION DATA CODES

FIELD OF THE INVENTION

This invention concerns television receivers having closed captioning circuitry.

BACKGROUND OF THE INVENTION

A closed-caption system aids the hearing-impaired in enjoying television programs. In such a system, text corresponding to the words spoken in a television program are transmitted with the picture and sound information from the broadcast transmitter. The closed-caption text is displayed at the bottom of the screen (similar to the way in which motion picture subtitles are displayed) so that a hearing-impaired viewer may better understand the television program.

The Television Decoder Circuitry Act of 1990 requires the inclusion of a closed-caption decoder in a television receivers sold in the United States having display screens which are thirteen inches (approximately 33 cm.) or larger (measured diagonally). In a closed-caption system implemented in accordance with this Act, closed-caption text is transmitted a few characters at a time during the vertical blanking interval on television line 21. The above-mentioned closed-caption decoder captures the data on television line 21, and displays it via on-screen display circuitry. It should be noted that at the present time not all television programs are closed-captioned.

The FCC has mandated that the closed-caption display circuitry must be capable of being turned on or off at the viewers option. Clearly, the vast majority of purchasers of new television receivers are not hearing-impaired, and have little or no need for the closed-captioning capability built in to their new television receivers. Therefore, it is felt that the default state of the closed-captioning system should be the "off" state.

Unfortunately, if the default state of the closed-captioning system is the "off" state, a problem arises in that the viewer will not know when closed caption data is available for display, because, as noted above, not all television programs are accompanied by closed-caption data.

In FM stereo receivers, it is common practice to light a stereo-available indicator in response to the detection of the stereo pilot signal. Detection of the stereo pilot signal is a reliable indicator of the presence of stereo audio because the pilot signal always accompanies a stereo broadcast. At first glance, it might appear that one should look for a similar signal which always accompanies closed-caption information, such as the closed-caption run-in clock, or look for a NEW-CHARACTER-RECEIVED (i.e., NEWDATA) signal from the closed-caption data slicer. Unfortunately, unlike the stereo pilot signal of the above-mentioned FM stereo example, the run in clock may be present even in the absence of closed-captioning because many television broadcasters do not turn off their closed-caption encoders in the absence of closed-caption information, but rather send a series of null characters (e.g., the code "00") on line 21. Moreover, in the absence of closed-caption information, the encoders of some broadcasters transmit a sequence of closed-caption commands which cause an erasure of data which may be remaining on the screen if, for example, a user changed from a channel which was transmitting a closed-captioned program to a channel which was not. Thus, even though no useful information is being sent, the run-in clock is present and actual closed-caption characters (i.e, null characters, or an erase sequence) are being received. For these reasons, neither the run-in clock nor a NEW-CHARACTER-RECEIVED signal is a reliable indicator of the presence of useful closed-captioning.

SUMMARY OF THE INVENTION

In a television system including closed-caption circuitry for receiving and decoding closed-caption data, a controller continually monitors the closed-caption circuitry for an indication of the presence of any of a plurality of predetermined valid closed-caption data codes. Every time any of the predetermined valid closed-caption data codes is detected, a timer is reset to begin timing a predetermined time interval, and an on-screen display indicating that closed-caption data are available is enabled. If a subsequent one of the predetermined valid closed-caption data codes is not detected before the expiration of the time interval, then the on-screen display indicating that closed-caption data are available is disabled. In another embodiment of the invention, a lamp is illuminated to indicate the availability of useful closed-caption data.

DETAILED DESCRIPTION OF THE DRAWING

Figure 1:
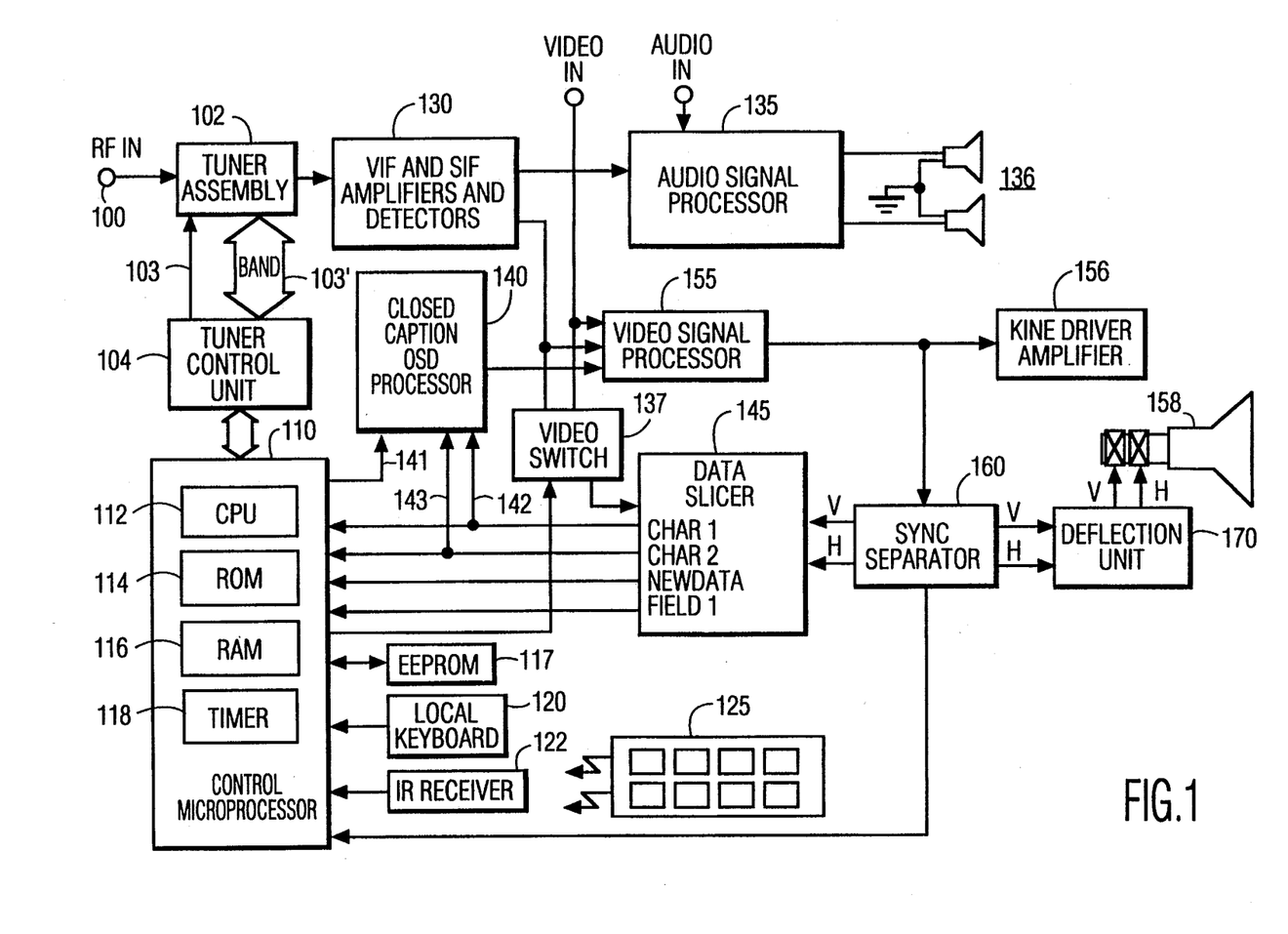
FIG. 1 is a block diagram of a portion of a television receiver suitable for implementing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and band-switching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer ($\mu$C) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116. RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, that it may be desirable to use a suitable form of standby power to preserve its contents when the receiver is turned off.

Microcomputer 110 also includes a timer 118 the operation of which will be described below. Microcomputer (or controller) 110 generates a control signal for causing tuner control unit 104 to control tuner 102 to select a particular RF signal, in response to user-entered control signals from local keyboard 120 and from infrared (IR) receiver 122.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically-erasable programmable read only memory (EEPROM) 117 is coupled to controller 110, and serves as a non-volatile storage element for storing auto programming channel data, and user-entered channel data.

The processed video signal at the output of video signal processor unit 155, is applied to a Kine Driver Amplifier 156 for amplification and then applied to the guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam. That portion of FIG. 1 described thusfar is known, for example, from the RCA CTC-140 color television manufactured by Thomson Consumer Electronics, Inc., Indianapolis, Ind.

A first embodiment of the invention will now be described with reference to the remainder of FIG. 1, and the on-screen display illustration of FIG. 2, and the flowcharts of FIGS. 3 and 4.

A DATA SLICER 145 receives closed caption data at a first input from VIF/SIF amplifier and detector unit 130, and at a second input from the VIDEO IN terminal via a VIDEO SWITCH 137 which selects the proper source of closed-caption data under control of controller 110. DATA SLICER 145 supplies closed-caption data to CLOSED CAPTION OSD PROCESSOR 140 via lines 142 and 143. DATA SLICER 145 supplies closed-caption status data (NEWDATA, FIELD 1) to controller 110. Under control of controller 110, via control line 141, CLOSED CAPTION OSD PROCESSOR 140 generates character signals, and applies them to an input of video signal processor 155, for inclusion in the processed video signal. Alternatively, CLOSED CAPTION OSD PROCESSOR 140 and DATA SLICER 145 may be included in controller 110.

Figure 2:
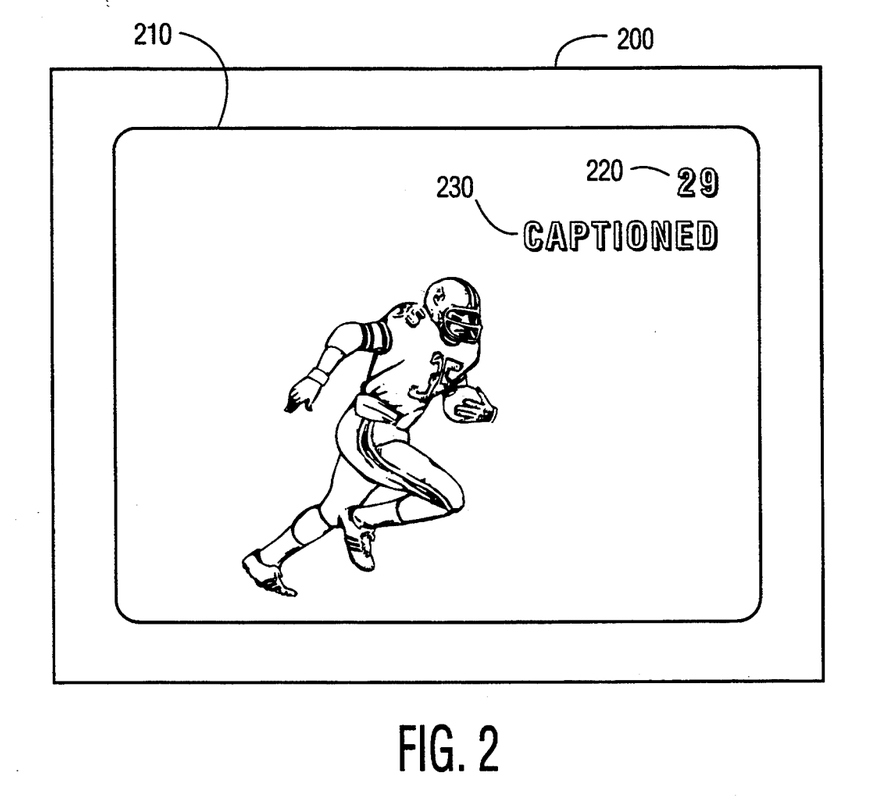
FIG. 2 is an illustration of a television receiver having a screen display produced in accordance with the invention.
Figure 3:
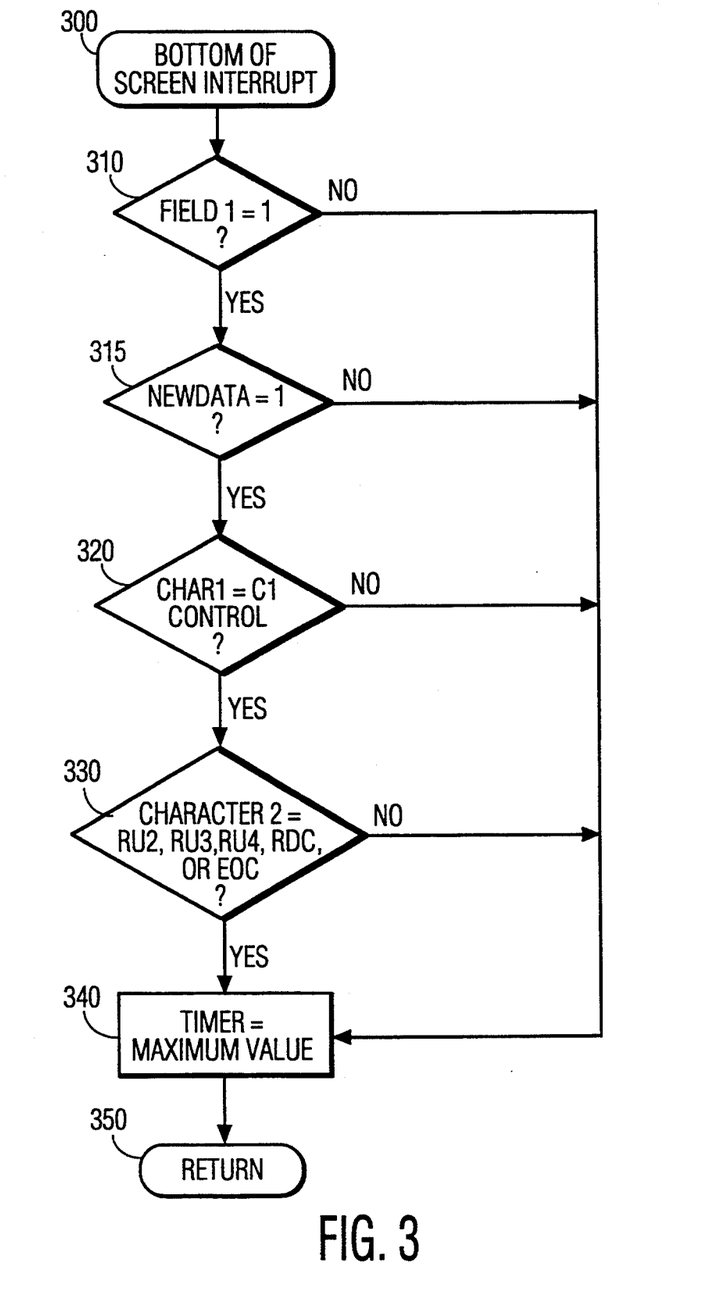
FIGS. 3, 4a, and 4b are flowcharts showing portions of the program of controller 110 of FIG. 1.

FIG. 2 shows a television receiver 200 having a display screen 210. An on-screen display provides channel number information 220 (e.g., channel 29), and closed-caption information 230 (e.g., CAPTIONED or CC). Information displays 220 and 230 are displayed each time a new channel is selected by a user, and each time a "display" or "status" key on remote control unit 125 is pressed. Preferably, the CAPTIONED status message is not displayed in the absence of useful closed-captioning, although a message such as NO CC could be displayed, if desired.

It is herein recognized that although one cannot rely on the presence of the run-in clock or the NEWDATA signal, five particular closed-caption commands are reliable indicators of active closed-captioning (although other closed captioned data may be used). These commands are: ROLL UP 2 (RU2), ROLL UP 3 (RU3), ROLL UP 4 (RU4), RESUME DIRECT CAPTIONING (RDC), and END OF CAPTIONING (EOC). These commands are referred to hereinafter as valid closed-caption commands. The detection of one of these commands indicates that closed captioning is active on the currently-tuned channel. Upon detection of one of these commands, controller 110 enables an on-screen display of CAPTIONED as shown in FIG. 2, when the user next presses the "status" or "display" key of remote control unit 125. If a new channel is tuned, the status display is automatically activated to display the new channel number. If one of the above-mentioned five commands is detected during the period in which the channel number is being displayed, controller 110 causes an on-screen display of CAPTIONED as shown in FIG. 2.

It is not sufficient to simply set a CAPTIONED flag upon detection of one of the valid closed-caption commands; one must also set forth criterion for clearing the flag in the absence of useful closed-caption data. Some television programs are partially closed-captioned (such as news programs), and some non-closed-captioned programs are interspersed with commercial messages having closed-captioning. In order to avoid providing the wrong information concerning the availability of closed-captioning, it has been decided to start a timer and enable a CAPTIONED message upon detecting valid closed-captioning signals and disable the CAPTIONED message upon expiration of the timed period. In this regard, it has been observed that during a dialogue in a television program there occur lapses between the point when one person stops speaking and another begins to speak. Few of these lapses exceed 10 seconds, but some may last as long as 60 seconds. It is felt, therefore, that a range of reasonable times in which to maintain the enablement of the closed caption message is from 10 to 60 seconds, but preferably 20 seconds.

Detection of closed-caption data does not automatically cause the display of the CAPTIONED message, for the following reason. There may be portions of a televised captioned movie in which there are no words spoken ( and therefore no closed-caption messages) for a a period greater than the predetermined timer period (i.e., 10 to 60 seconds). In that event, the CAPTIONED message will be disabled, and reenabled upon the next spoken word throughout the movie. This would cause repeated display of the word CAPTIONED upon each acquisition of valid closed-caption commands, which it is felt would be an annoyance to the viewer. Thus, it is felt that the better solution is to enable display of the word CAPTIONED, but refrain from displaying the message until commanded by the viewer via a status command, or a channel change command.

In operation, a BOTTOM OF SCREEN interrupt signal is provided by the SYNC SEPARATOR 160 before the start of vertical blanking. It causes controller 110 to enter a section of its program code, shown in FIG. 3, at step 300. At step 310 a check is made to see if the current TV field is field 1 (currently all closed-captioning data is sent on field 1). If not, the routine is exited at step 350. If the current field is field 1, a check is made at step 315 to see if the NEWDATA flag is set (indicating that the data is newly received). If the data is old, the routine is exited at step 350. If NEWDATA is set, the yes path is taken to step 320 at which a check is made to see if newly-received character 1 is the C1 (channel 1) control code. If not, the routine is exited at step 350. If so, the program advances to step 330 at which a check is made to see if the newly received data is one of the above-mentioned valid closed-caption commands (i.e., ROLL UP 2 (RU2), ROLL UP 3 (RU3), ROLL UP 4 (RU4), RESUME DIRECT CAPTIONING (RDC), and END OF CAPTIONING (EOC)). Of none of those commands is detected then the NO path is taken to step 350 and the routine is exited. Otherwise, TIMER 118 is set to its maximum value at step 340 and the routine is exited.

Figures 4A, 4B, 4C:
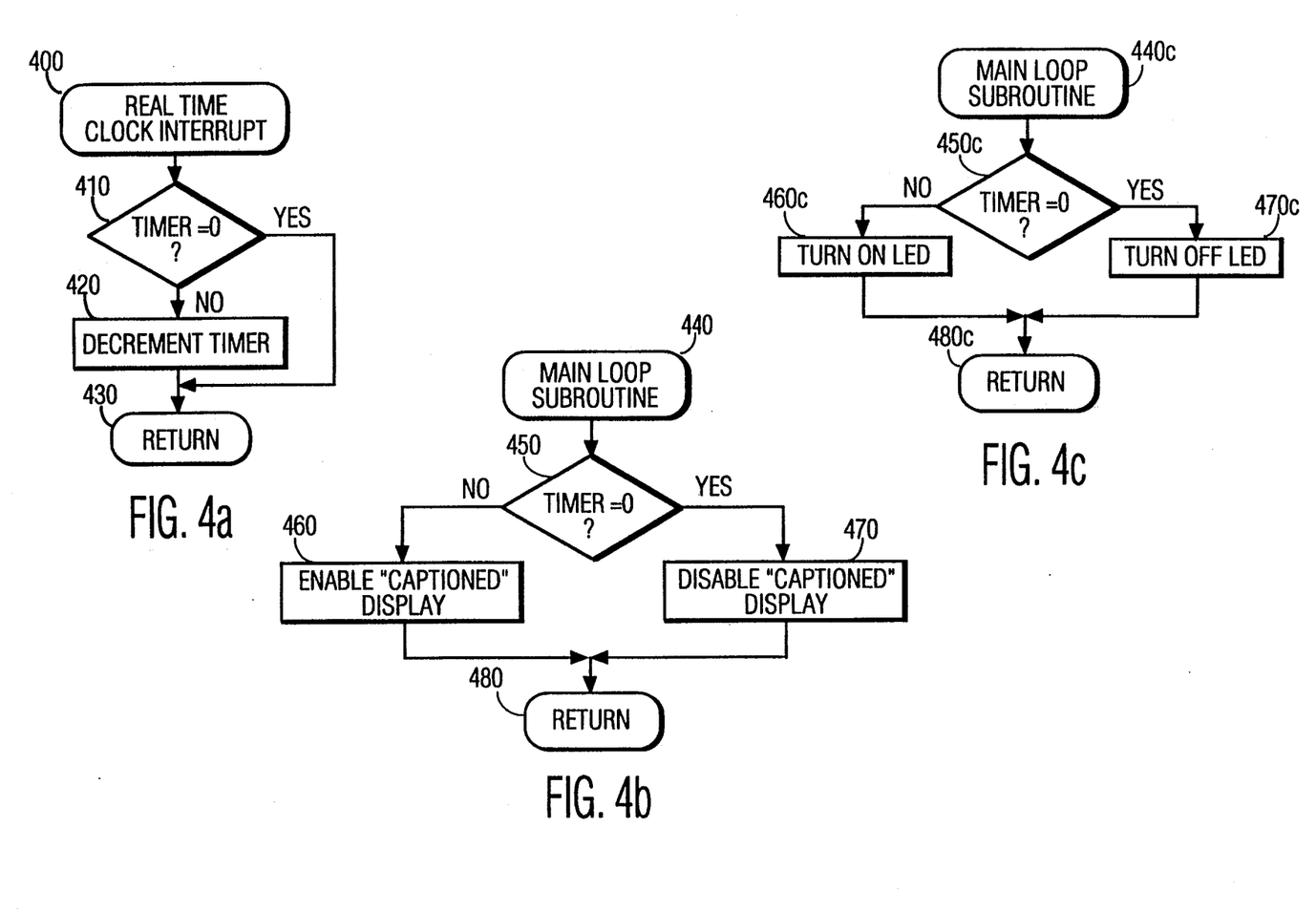
FIG. 4c is a flowchart showing a portion of the program of controller 1010 of FIG. 10.

Every 20 milliseconds, a REAL TIME CLOCK interrupt causes controller 110 to enter a portion of its program code, shown in FIG. 4a, at step 400. The REAL TIME CLOCK (not shown) may be part of controller 110 or may be external. At step 410 the timer is checked to see if its time period has expired. If so, the routine is exited at step 430. If the count is not expired, the count is decremented at step 420, and the routine exited at step 430. During the course of executing its control program, controller 110 enters the MAIN LOOP SUBROUTINE, shown in FIG. 4b, at step 440. At step 450, TIMER 118 is once again checked to see if its time period has expired. If not, the CAPTIONED display is enabled (for example by setting a flag bit in RAM 116). If so, the the CAPTIONED display is disabled (for example by clearing a the flag bit in RAM 116). The subroutine is exited at step 480.

Figure 5:
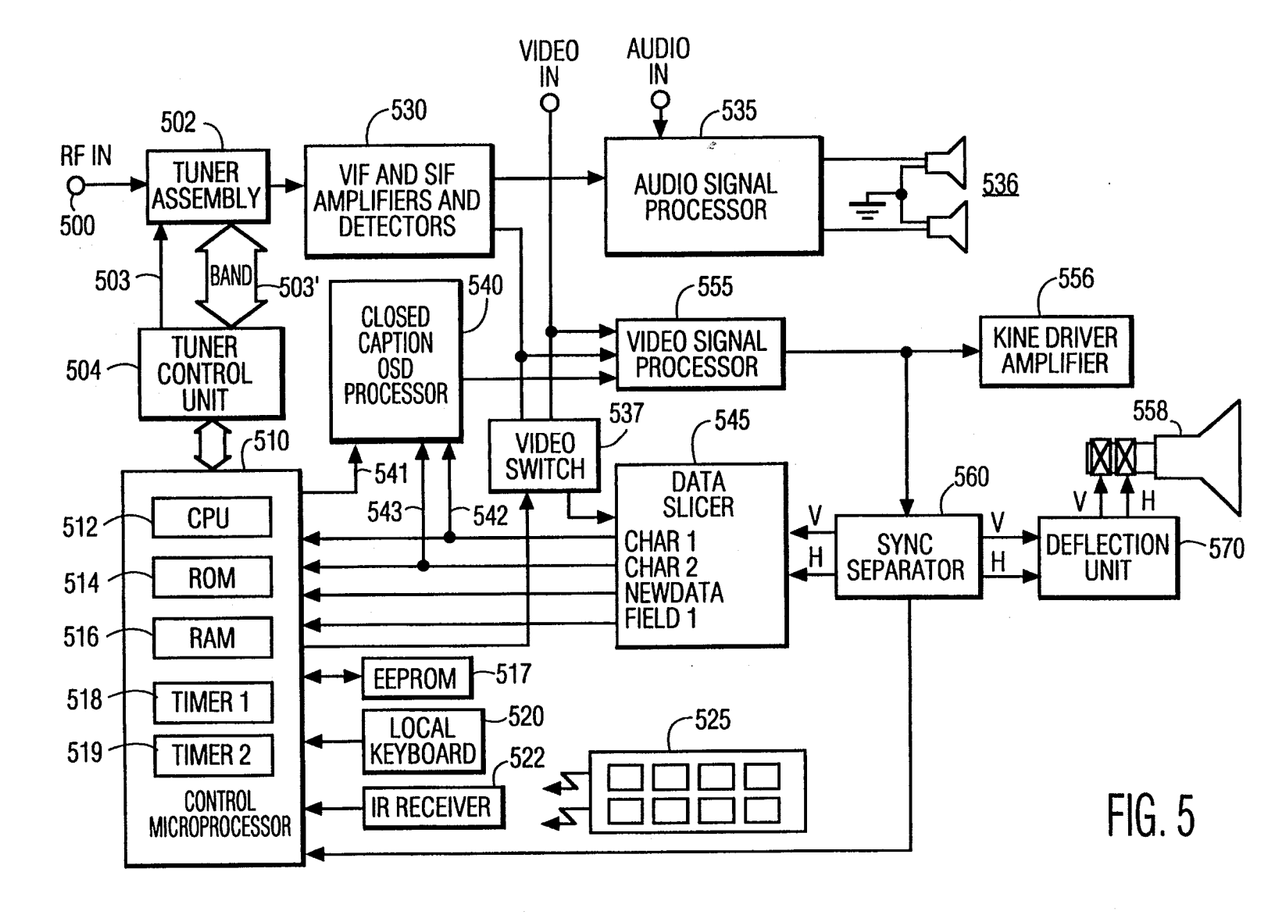
FIG. 5 is a block diagram of a portion of a television receiver suitable for implementing a second embodiment of the invention.

In addition to closed-captioning, a text mode of operation for showing time-of-day and television programming information has been proposed. This text mode is intended to display seven to fifteen lines of information, and utilize the same circuitry as closed-captioning. This text mode information is likely to be transmitted to the receiver on television line 21 of field 1. An embodiment of the invention which addresses both closed-captioning and text mode is shown in FIG. 5. Elements of FIG. 5, having similar reference numbers to elements of FIG. 1, have similar functions and will not be described again. A timer 519, designated TIMER 2, times the time period during which controller 110 looks for certain additional commands which indicate an actual text mode transmission. These additional commands are: TEXT RESTART (TR) and RESUME TEXT DISPLAY (RTD).

Figure 6:
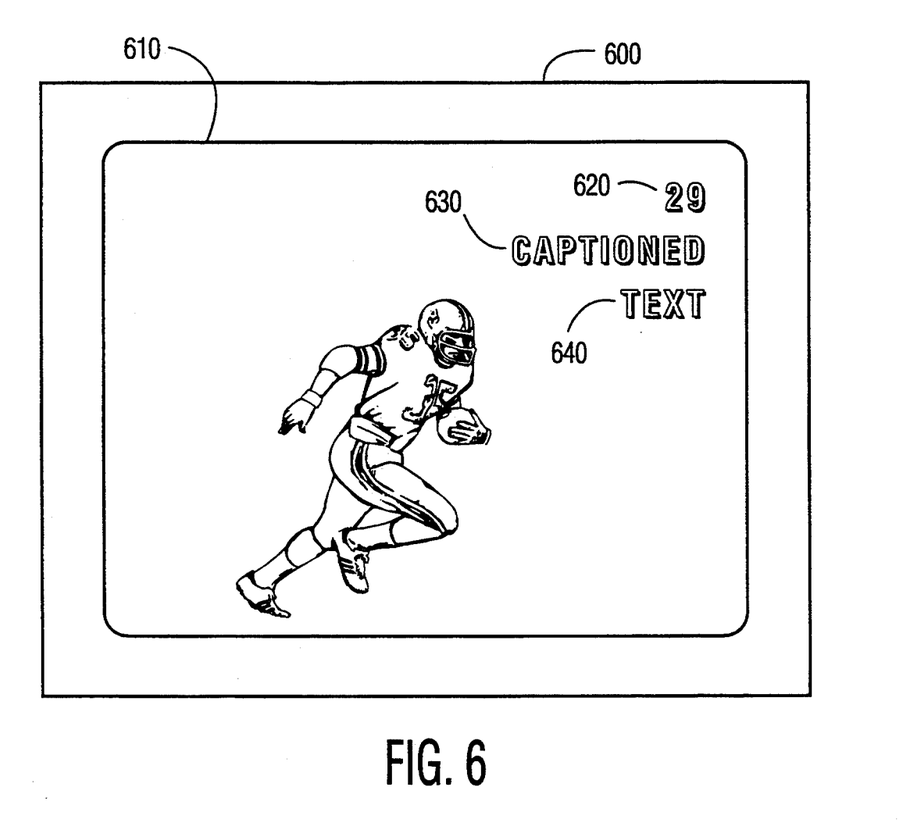
FIG. 6 is an illustration of a television receiver having a screen display produced in accordance with the second embodiment of the invention.
Figure 7:
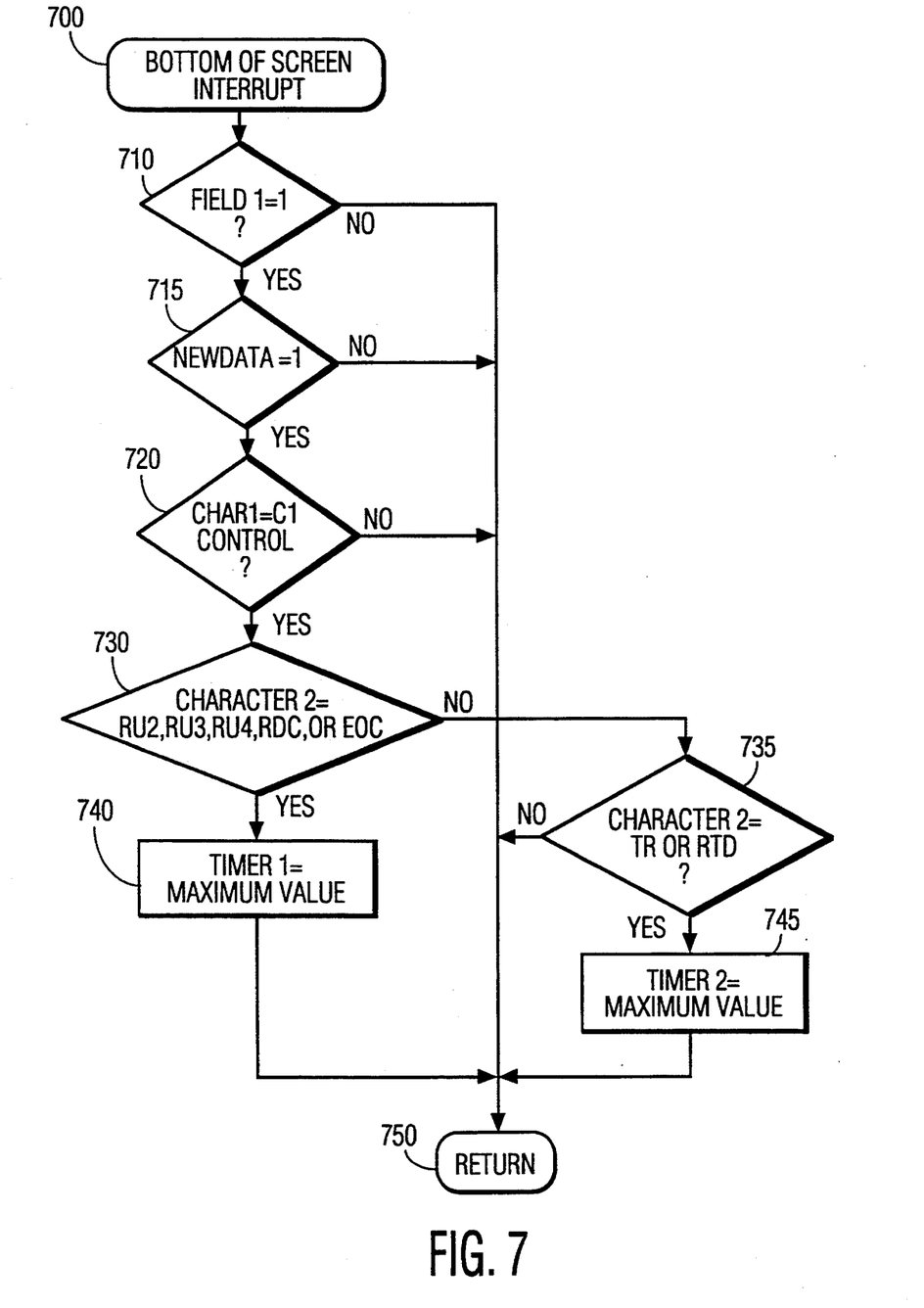
FIGS. 7, 8, and 9 are flowcharts showing portions of the program of controller 510 of FIG. 5.

FIG. 6 shows a television receiver 600 having a display screen 610 displaying a status display which indicates channel information 620, and the presence of both closed-caption information 630 and text mode information 640. FIG. 7 is a flowchart showing a routine similar to that of FIG. 3, except that two timers are employed (i.e., TIMER 1 for closed-captions and TIMER 2 for text mode). Steps of FIG. 7, having similar reference numbers to steps of FIG. 3, have similar functions and will not be described again. If the test performed at step 730 indicates that the newly-received data is not one of the valid closed-caption commands, then the NO path is taken to step 735 at which a check is made to see if the newly-received data is one of the above-mentioned valid text mode commands (i.e., TEXT RESTART (TR) and RESUME TEXT DISPLAY (RTD)). If neither of those commands is detected, then the NO path is taken to step 750 and the routine is exited. Otherwise, TIMER 2 (i.e., 519 of FIG. 5) is set to its maximum value at step 745 and the routine is exited.

Figure 8:
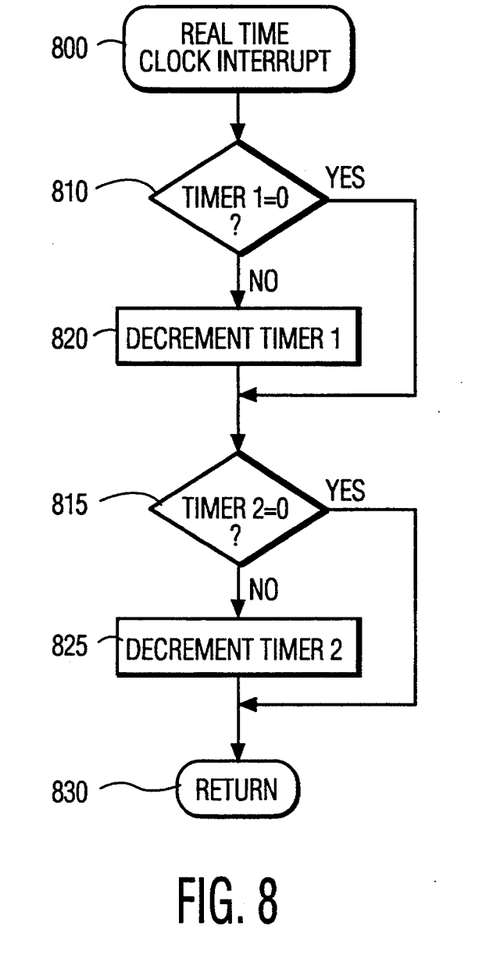
Figure 9:
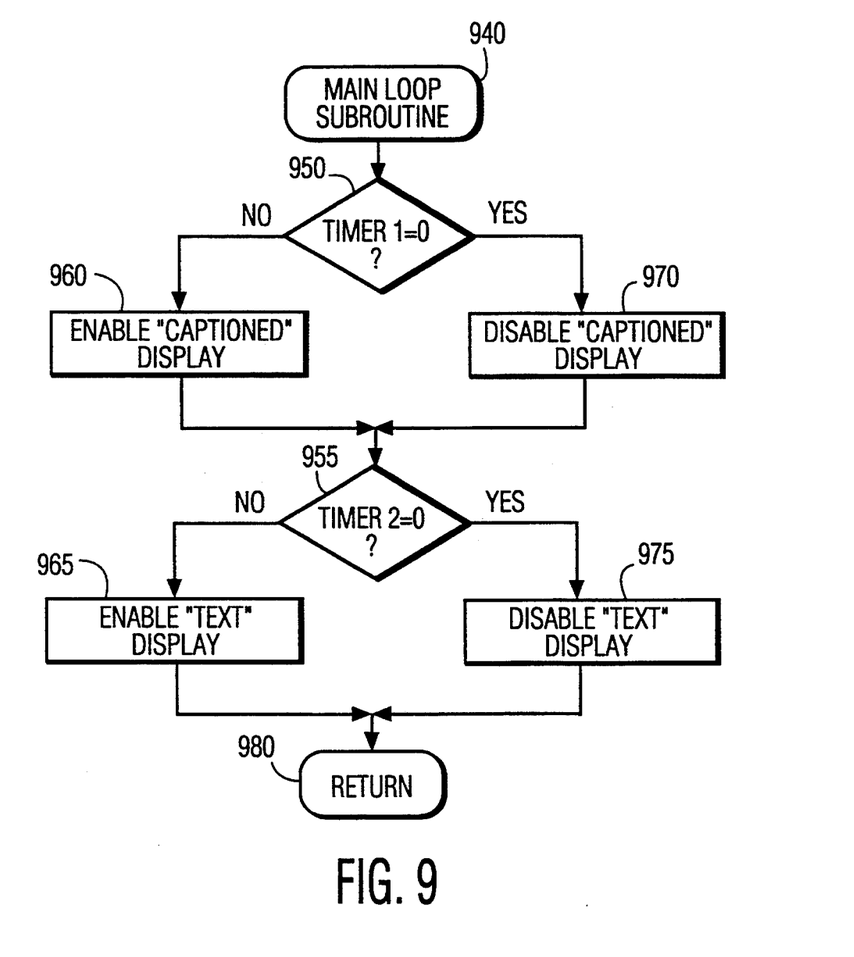

FIG. 8 is similar to FIG. 4a in that it includes steps 800–820 which check and decrement TIMER 1, but it adds steps 815 and 825 which check and decrement TIMER 2. FIG. 9 is similar to FIG. 4b in that it includes steps 940–970 which check TIMER 1 and enable or disable the CAPTIONED display, but it adds steps 955, 965 and 975 which check TIMER 2 and enable or disable the TEXT display.

Figure 10:
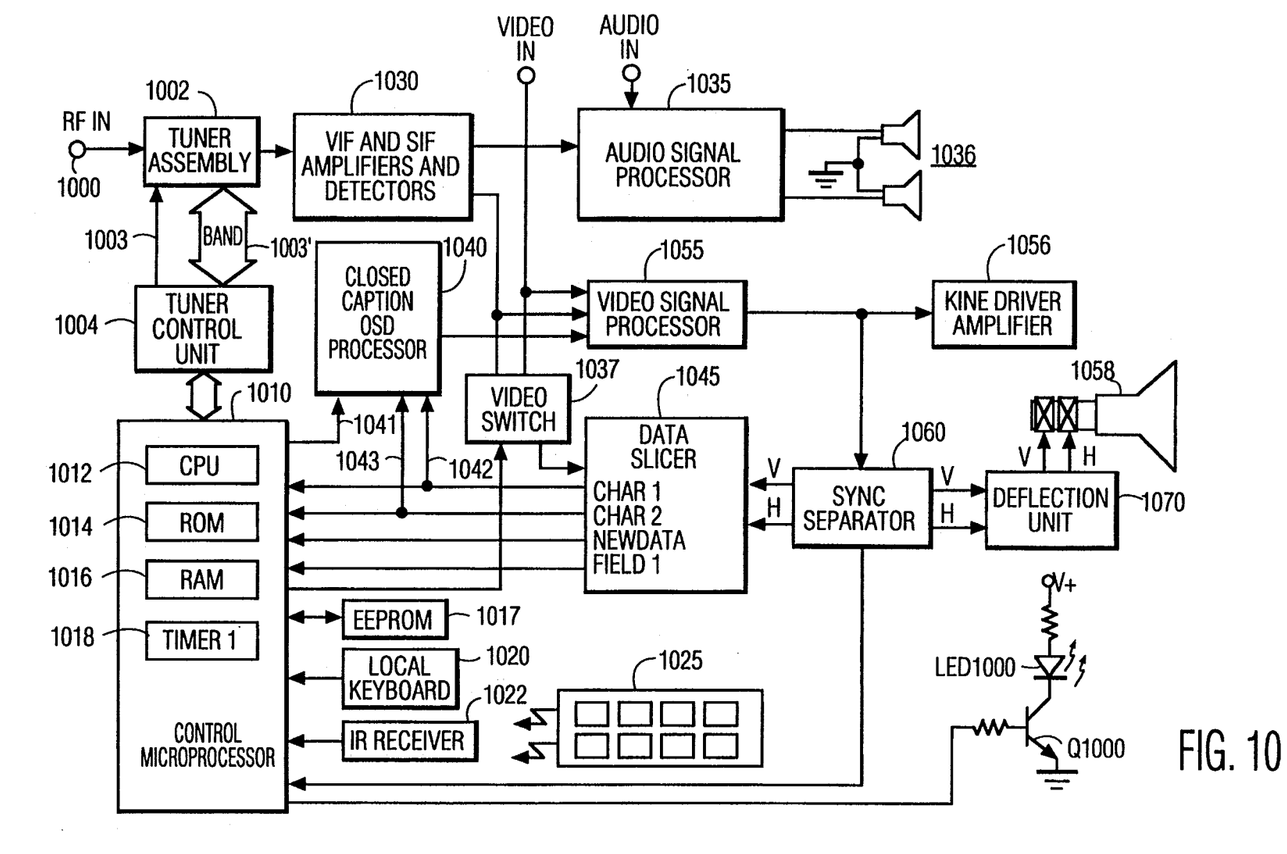
FIG. 10 is a block diagram of a portion of a television receiver suitable for implementing a third embodiment of the invention.

An embodiment of the invention which indicates the availability of useful closed-caption data by illuminating a panel-mounted LED (or other form of lamp, such as a neon light or incandescent lamp) is shown in FIG. 10. Elements of FIG. 10, having similar reference numbers to elements of FIG. 1, have similar functions and will not be described again. A lamp driver circuit comprising LED 1000, switch transistor Q1000 and associated current limiting resistors is activated by controller 1010 each for so long as the TIMER 1018 is timing. LED 1000 is extinguished when the time period timed by TIMER 1018 has expired. FIG. 4c is substituted for FIG. 4b when LED 1000 is employed. If the LED embodiment is used, it is felt that there is no need to wait for user-recall of status, and the LED can be illuminated immediately upon detection of the valid closed-caption codes. During the course of executing its control program, controller 1010 enters the MAIN LOOP SUBROUTINE, shown in FIG. 4c, at step 440c. At step 450c, TIMER 1018 is once again checked to see if its time period has expired. If not, LED 1000 is illuminated at step 460c. If so, the LED 1000 is extinguished at step 470c. The subroutine is exited at step 480.

The subject invention can be applied in the event field 2 becomes active for the transmission of closed-caption and text data, by timing third and fourth periods relating to the presence of the field 2 data, and such application is felt to be within the scope of the claims. The term television receiver as used herein is intended to include television receivers and monitors having a display screen (commonly called television sets, or TVs), and television receivers not having a display screen, such as VCRs. The term television system as used herein is intended to include the television receivers mentioned above and videodisc players. It is noted that the invention will prove quite useful if built into a VCR or videodisc player since it will then provide information as to the presence of closed-captioning information to even those viewers not owning a television set having closed-caption capability.

What is claimed is:

1. A detector for detecting the presence of closed-caption data in a video signal, comprising:
   means for receiving and decoding said closed-caption data;
   said closed-captioned data including a proper subset of closed-caption data codes;
   control means for continually monitoring said decoded closed-caption data for an indication of the presence of any of said proper subset of closed-caption data codes;
   means for timing a predetermined time period, said means for timing being controlled by said control means;
   said control means resetting said timing means to begin timing a predetermined time interval, and enabling generation of a message indicating availability of closed-caption data upon detecting any of said proper subset of said closed-caption data codes;
   said control means disabling generation of said message if a subsequent one of said proper subset of said closed-caption data codes is not detected before the expiration of said time interval.

2. A detector for detecting the presence of closed-caption data in a video signal, comprising:
   means for receiving and decoding said closed-caption data;
   said closed-captioned data including a proper subset of closed-caption data codes;
   control means for continually monitoring said decoded closed-caption data for an indication of the presence of any of said proper subset of said closed-caption data codes;
   means for timing a predetermined time interval, said means for timing being controlled by said control means;
   said control means resetting said timing means to begin timing said predetermined time interval, and enabling generation of a message indicating availability of closed-caption data upon detecting any of said proper subset of said closed-caption data codes;
   said control means disabling generation of said message if a subsequent one of said proper subset of said closed-caption data codes is not detected before the expiration of said time interval;
   wherein said proper subset of closed-caption data codes includes ROLL UP 2 (RU2), ROLL UP 3 (RU3), ROLL UP 4 (RU4), RESUME DIRECT CAPTIONING (RDC), and END OF CAPTIONING (EOC).

3. The detector of claim 2 wherein said predetermined time interval is in the range of 10 to 60 seconds.

4. A method for detecting the presence of closed-caption data in a video signal, comprising the steps of:
   receiving and decoding said closed-caption data, saint closed-captioned data including a proper subset of closed-caption data codes;
   continually monitoring said decoded closed-caption data for an indication of the presence of any of a plurality of said proper subset of closed-caption data codes;
   controlling a timer to time a predetermined time period;
   resetting said timer to begin timing said predetermined time period, and enabling generation of a message indicating availability of closed-caption data upon detecting any of said said proper subset of closed-caption data codes; and
   disabling generation of said message if a subsequent one of said said proper subset of closed-caption data codes is not detected before the expiration of said time period.

5. A method for detecting the presence of closed-caption data in a video signal, comprising the steps of:
   receiving and decoding said closed-caption data, said closed-captioned data including a proper subset of closed-caption data codes;
   continually monitoring said decoded closed-caption data for an indication of the presence of any of a plurality of said proper subset of closed-caption data codes;
   controlling a timer to time a predetermined time period;
   resetting said timer to begin timing said predetermined time period, and enabling generation of a message indicating availability of closed-caption data upon detecting any of said said proper subset of closed-caption data codes; and
   disabling generation of said message if a subsequent one of said said proper subset of closed-caption data codes is not detected before the expiration of said time period;
   wherein said proper subset of closed-caption data codes includes ROLL UP 2 (RU2), ROLL UP 3 (RU3), ROLL UP 4 (RU4), RESUME DIRECT CAPTIONING (RDC), and END OF CAPTIONING (EOC).

6. The method of claim 5 wherein said predetermined time period is in the range of 10 to 60 seconds.

7. In a television system including closed-caption circuitry for receiving and decoding closed-caption data, apparatus comprising:
   means for receiving data input by a user;
   a controller for continually monitoring said closed-caption circuitry for an indication of the presence of any of a proper subset of closed-caption data codes;
   a timer coupled to said controller for timing a predetermined time period;
   a storage location for storing a flag bit in one of a set or reset state;
   said controller resetting said timer to begin timing said predetermined time period, and setting said flag bit upon detecting any of said proper subset of closed-caption data codes;

said controller resetting said flag bit if a subsequent one of said proper subset of closed-caption data codes is not detected before the expiration of the time period; and an on-screen display for providing a status message under control of said controller in response to said data input by a user;

said controller causing said on-screen display to display a status message indicating that closed-caption data are available in response to said input by said user and in response to said flag bit being set.

8. The apparatus of claim 7 wherein said proper subset of closed-caption data codes includes ROLL UP 2 (RU2), ROLL UP 3 (RU3), ROLL UP 4 (RU4), RESUME DIRECT CAPTIONING (RDC), and END OF CAPTIONING (EOC).

9. The apparatus of claim 8 wherein said predetermined time period is in the range of 10 to 60 seconds.

10. A television receiver, comprising:

means for selecting one of a plurality of a television signals, each of which may be encoded with closed-caption data;

means for entering data in response to operation by a user;

means for acquiring said closed-captioned data from said television signal and decoding said closed-captioned data, said closed-captioned data including a proper subset of closed-caption data codes;

control means coupled to said acquiring means for receiving and examining said closed-captioned data for correspondence to one of said proper subset of closed-caption data codes; and on-screen display and graphics generator means coupled to said control means for producing text characters for display in response to data entered by a user, and in response to a selection of one of said plurality of television signals;

said control means, further including timing means for timing a predetermined period, said control means controlling said timing means to begin timing said predetermined period in response to a detection of one of said proper subset of closed-caption data codes;

said control means enabling generation of a message informing said user of the availability of closed-caption data in response to said detection of said one of said proper subset of closed-caption data codes, and disables the generation of said message informing said user of the availability of closed-caption data in response to the expiration of said predetermined time period:

said control means causing said on screen display means to display said message informing said user of the availability of closed-caption data upon selecting a television signal if said generation of said message is enabled, and said control means causing said on screen display means to display said message informing said user of the availability of closed-caption data in response to said user-entered data if said generation of said message is enabled.

11. The apparatus of claim 10 wherein said proper subset of closed-caption data codes includes ROLL UP 2 (RU2), ROLL UP 3 (RU3), ROLL UP 4 (RU4), RESUME DIRECT CAPTIONING (RDC), and END OF CAPTIONING (EOC).

12. The apparatus of claim 11 wherein said predetermined time period is in the range of 10 to 60 seconds.

13. A television receiver, comprising:

means for selecting one of a plurality of a television signals, each of which may be encoded with closed-caption data;

means for entering data in response to operation by a user;

means for acquiring text mode data associated with a closed-caption system from said television signal and decoding said text mode data;

control means coupled to said means for acquiring for receiving and examining said text mode data for correspondence to one of a predetermined proper subset of text mode commands; and on-screen display generator means coupled to said control means for producing text characters for display in response to data entered by a user, and in response to a selection of one of said plurality of television signals;

said control means, further including timing means for timing a predetermined period, said control means controlling said timing means to begin timing said predetermined period in response to a detection of one of said proper subset of text mode commands;

said control means enabling generation of a message informing said user of the availability of text mode data in response to said detection of said one of said predetermined proper subset of text mode commands, and disables the generation of said message informing said user of the availability of text mode data in response to the expiration of said predetermined time period;

said control means causing said on screen display means to display said message informing said user of the availability of closed-caption data upon selecting a television signal if said generation of said message is enabled, and control means causing said on screen display means to display said message informing said user of the availability of text mode data in response to said user-entered data if said generation of said message is enabled.

14. A television receiver, comprising:

means for selecting one of a plurality of a television signals, each of which may be encoded with closed-caption data;

means for entering data in response to operation by a user;

means for acquiring text mode data associated with a closed-caption system from said television signal and decoding said text mode data;

control means coupled to said acquiring means for receiving and examining said text mode data for correspondence to one of a predetermined proper subset of text mode commands; and on-screen display generator means coupled to said control means for producing text characters for display in response to data entered by a user, and in response to a selection of one of said plurality of television signals;

said control means, further including timing means for timing a predetermined period, said control means controlling said timing means to begin timing said predetermined period in response to a detection of one of said proper subset of text mode commands;

said control means enabling generation of a message informing said user of the availability of text mode data in response to said detection of said one of said predetermined proper subset of text mode commands, and disables the generation of said message informing said user of the availability of text mode data in response to the expiration of said predetermined time period;

said control means causing said on screen display means to display said message informing said user of the availability of closed-caption data upon selecting a television signal if said generation of said message is enabled, and control means causing said on screen display means to display said message informing said user of the availability of text mode data in response to said user-entered data if said generation of said message is enabled; and, said predetermined proper subset of text mode commands includes TEXT RESTART (TR) and RESUME TEXT DISPLAY (RTD).

15. The apparatus of claim 14 wherein said predetermined time period is in the range of 10 to 60 seconds.

16. A detector for detecting the presence of closed-caption data in a video signal, comprising:

means for receiving and decoding said closed-caption data;

control means for continually monitoring said decoded closed-caption data for an indication of the presence of any of a predetermined proper subset of valid closed-caption data codes;

means for timing a predetermined time period, said means for timing being controlled by said control means;

a lamp for indicating presence of closed-caption data;

said control means resetting said timing means to begin timing said predetermined time period, and illuminating said lamp upon detecting any of said predetermined proper subset of valid closed-caption data codes;

said control means extinguishing said lamp if a subsequent one of said predetermined proper subset of valid closed-caption data codes is not detected before the expiration of said time period.

17. A detector for detecting the presence of closed-caption data in a video signal, comprising:

means for receiving and decoding said closed-caption data;

control means for continually monitoring said decoded closed-caption data for an indication of the presence of any of a predetermined proper subset of valid closed-caption data codes;

means for timing a predetermined time period, said means for timing being controlled by said control means; and a lamp for indicating presence of closed-caption data;

said control means resetting said timer to begin timing a predetermined time period, and illuminating said lamp upon detecting any of said predetermined proper subset of valid closed caption data codes;

said control means extinguishing said lamp if a subsequent one of said predetermined proper subset of valid closed-caption data codes is not detected before the expiration of said time period; and said lamp is an LED.

* * * * *